(12) United States Patent
Futenma et al.

(10) Patent No.: US 9,083,950 B2
(45) Date of Patent: Jul. 14, 2015

(54) INFORMATION PROCESSING APPARATUS, COMPUTER-READABLE STORAGE MEDIUM, AND METHOD FOR SENDING PACKETIZED FREQUENCY COMPONENTS OF PRECINCTS OF IMAGE DATA TO ANOTHER DEVICE

(75) Inventors: Satoshi Futenma, Tokyo (JP); Hideki Iwami, Saitama (JP)

(73) Assignee: SONY CORPORATION, Tokyo (JP)

( * ) Notice: Subject to any disclaimer, the term of this patent is extended or adjusted under 35 U.S.C. 154(b) by 1875 days.

(21) Appl. No.: 11/778,971

(22) Filed: Jul. 17, 2007

(65) Prior Publication Data
US 2008/0063078 A1 Mar. 13, 2008

(30) Foreign Application Priority Data
Jul. 19, 2006 (JP) .................................. 2006-196993

(51) Int. Cl.
| | |
|---|---|
| H04N 7/12 | (2006.01) |
| H04N 19/423 | (2014.01) |
| H04N 21/2662 | (2011.01) |
| H04N 21/433 | (2011.01) |
| H04N 21/6375 | (2011.01) |
| H04N 21/845 | (2011.01) |

(Continued)

(52) U.S. Cl.
CPC ... *H04N 19/00484* (2013.01); *H04N 19/00818* (2013.01); *H04N 19/00884* (2013.01); *H04N 21/2662* (2013.01); *H04N 21/4334* (2013.01); *H04N 21/6375* (2013.01); *H04N 21/8456* (2013.01)

(58) Field of Classification Search
CPC .................................................. H04N 7/26563
See application file for complete search history.

(56) References Cited

U.S. PATENT DOCUMENTS 5,880,856 A 3/1999 Ferriere
6,034,945 A * 3/2000 Hughes et al. ................ 370/230

(Continued)

FOREIGN PATENT DOCUMENTS

JP 8-242379 9/1996
JP 9-130800 5/1997

(Continued)

OTHER PUBLICATIONS

Victor Sanchez et al., "Prioritized Region of Interest Coding in JPEG2000," IEEE Transaction on Circuits and Systems for Video Technology, vol. 14, No. 9, Sep. 2004, pp. 1149-1155.*

(Continued)

*Primary Examiner* — Luu Pham
*Assistant Examiner* — Canh Le
(74) *Attorney, Agent, or Firm* — Finnegan, Henderson, Farabow, Garrett & Dunner, L.L.P.

(57) ABSTRACT

An information processing apparatus which sends image data subjected to line based wavelet transformation to another device is disclosed. The apparatus includes: a storing means for splitting the image data supplied in units of precincts that are the set of lines to be a unit of processing for the line based wavelet transformation for every frequency component, and storing a plurality of precincts of image data for every frequency component; a packetizing means for reading and packetizing the plurality of the precincts of image data stored by the storing means for each of the frequency components; and a sending means for sending the plurality of the precincts of image data packetized by the packetizing means for each of the frequency components to the another device.

7 Claims, 21 Drawing Sheets

(51) Int. Cl.
*H04N 19/63* (2014.01)
*H04N 19/70* (2014.01)

(56) References Cited

U.S. PATENT DOCUMENTS

| | | | |
|---|---|---|---|
| 6,259,735 | B1 | 7/2001 | Aono et al. |
| 6,546,143 | B1* | 4/2003 | Taubman et al. ............. 382/240 |
| 6,591,017 | B1* | 7/2003 | Fukuhara et al. ............ 382/240 |
| 6,707,948 | B1 | 3/2004 | Cosman et al. |
| 6,813,314 | B2 | 11/2004 | Aono et al. |
| 6,847,468 | B2 | 1/2005 | Ferriere |
| 6,944,349 | B1* | 9/2005 | Onno et al. .................. 382/240 |
| 7,031,386 | B2 | 4/2006 | Yamamoto et al. |
| 7,542,611 | B2* | 6/2009 | Yano et al. ................... 382/232 |
| 7,558,441 | B2* | 7/2009 | Owada ......................... 382/299 |
| 2001/0024530 | A1* | 9/2001 | Fukuhara et al. ............ 382/240 |
| 2002/0146073 | A1* | 10/2002 | Clark et al. .............. 375/240.26 |
| 2003/0118107 | A1* | 6/2003 | Itakura et al. ........... 375/240.19 |
| 2004/0126020 | A1* | 7/2004 | Sakuyama et al. ........... 382/232 |
| 2004/0141652 | A1* | 7/2004 | Fukuhara et al. ............ 382/232 |
| 2004/0148552 | A1* | 7/2004 | Matsumoto et al. .......... 714/712 |
| 2004/0151386 | A1* | 8/2004 | Kodama et al. .............. 382/232 |
| 2004/0175048 | A1* | 9/2004 | Pearlman et al. ............ 382/232 |
| 2005/0105503 | A1* | 5/2005 | Cayla et al. .................. 370/346 |
| 2006/0008166 | A1* | 1/2006 | Chai ............................. 382/240 |
| 2006/0204118 | A1* | 9/2006 | Fehmi et al. ................. 382/248 |
| 2007/0206671 | A1* | 9/2007 | Eshet et al. .............. 375/240.01 |
| 2008/0016260 | A1* | 1/2008 | Pennock et al. ............... 710/52 |

FOREIGN PATENT DOCUMENTS

| | | |
|---|---|---|
| JP | 2000-59781 | 2/2000 |
| JP | 2001-25018 | 1/2001 |
| JP | 2004-166254 | 6/2004 |

OTHER PUBLICATIONS

Majid Rabbani and Rajan Joshi, "An overview of the JPEG 2000 still image compression standard," Signal processing: IMAGE communication vol. 17, issue 1, Jan. 2002, pp. 3-48.*

Ivan V. Bajic, "Domain-Based Multiple Description Coding og Images and Video", IEEE Transactions on image processing, vol. 12, No. 10, Oct. 2003, pp. 1211-1225.*

Jon K. Rogers, "Robust Wavelet Zerotree image compression with fixed-length packetizing", pp. 1-10.*

Christos Chrysafis et al., "Line-Based, Reduced Memory, Wavelet Image Compression", IEEE Transactions on Image Processing, vol. 9, No. 3, Mar. 2000.

Wim Sweldens, "The Lifting Scheme: A Custom-Design Construction of Biorthogonal Wavelets", Applied and Computational Harmonic Analysis, 3, 186-200 (1996), Article No. 0015.

Kddi R&D Laboratories, "JH-3000N," Product Catalog, Apr. 2006, (8 pages, including English translation).

* cited by examiner

FIG. 11A WHEN OUTPUTTED FROM THE CODEC

FIG. 11B AFTER PACKETIZED

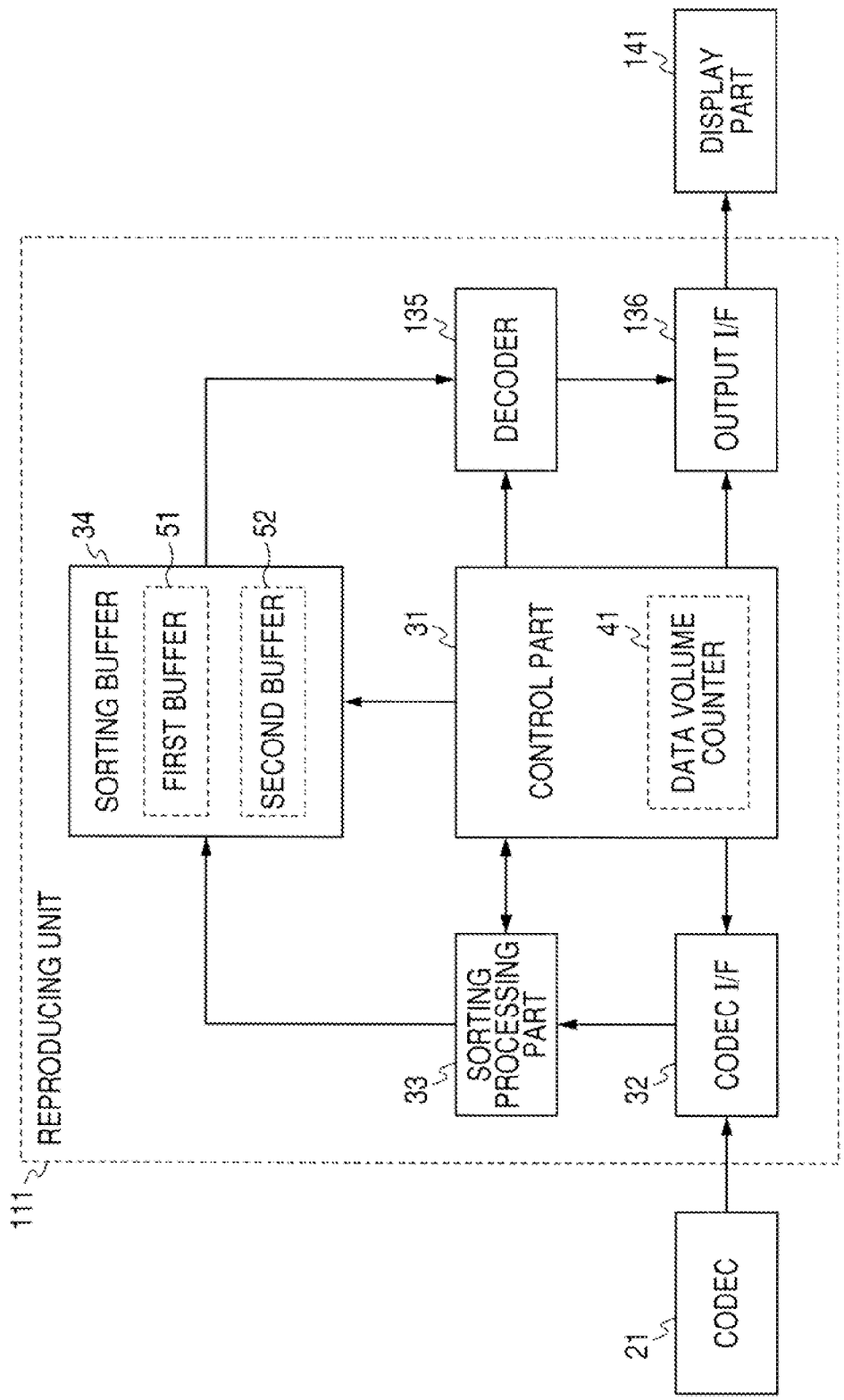

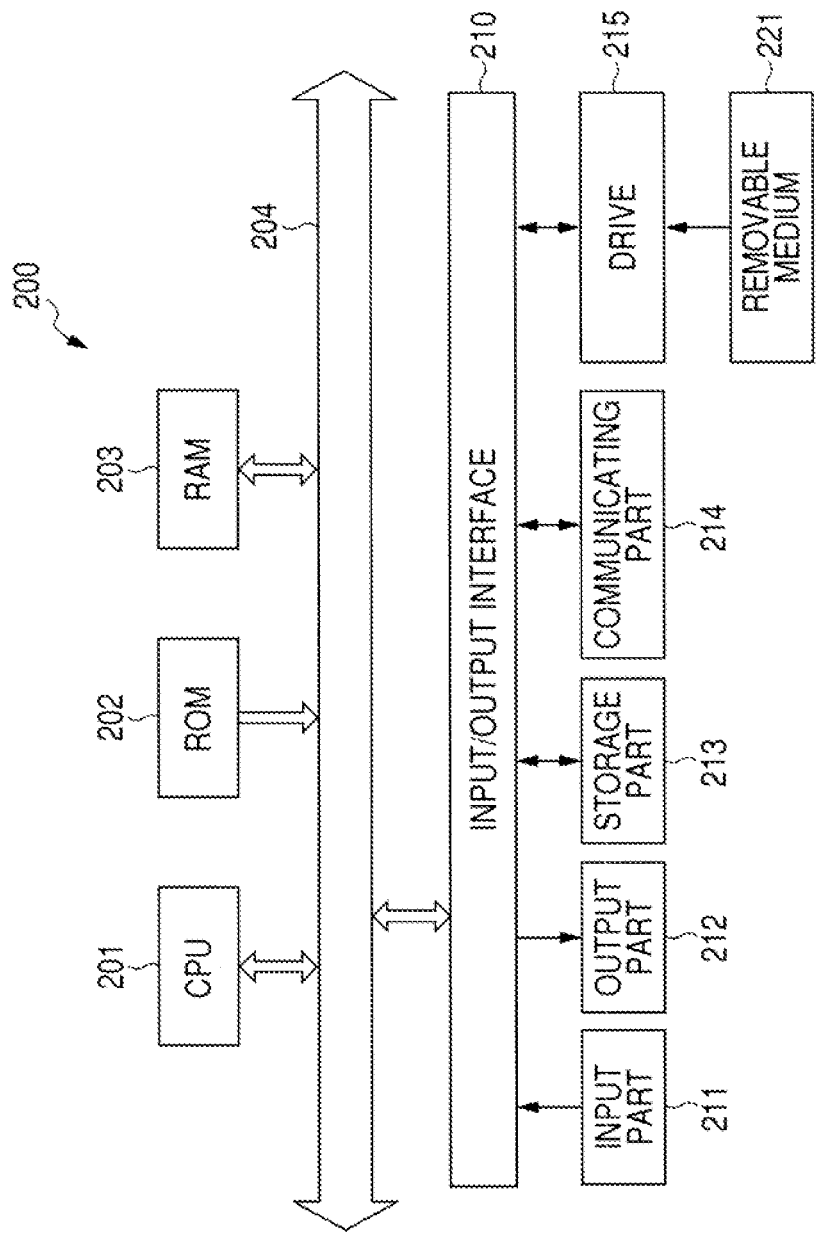

INFORMATION PROCESSING APPARATUS, COMPUTER-READABLE STORAGE MEDIUM, AND METHOD FOR SENDING PACKETIZED FREQUENCY COMPONENTS OF PRECINCTS OF IMAGE DATA TO ANOTHER DEVICE

CROSS REFERENCES TO RELATED APPLICATIONS

The present invention contains subject matter related to Japanese Patent Application JP 2006-196993 filed in the Japanese Patent Office on Jul. 19, 2006, the entire contents of which being incorporated herein by reference.

BACKGROUND OF THE INVENTION

1. Field of the Invention

The present invention relates to an apparatus and a method of information processing, a program, and a recording medium, and particularly to an apparatus and a method of processing information, a program, and a recording medium which can suppress image quality degradation as small as possible and can process information efficiently with a small delay.

2. Description of the Related Art

Heretofore, for communication paths, there are cable communication using cables, and radio communications using radio. Radio communication paths such as WLAN (Wireless Local Area Network), Bluetooth, UWB (Ultra Wide Band), and WiMax (Workwide Interoperability for Microwave Access) have more limited bandwidth than those of cable communications paths. On this account, in order to transmit moving images through radio communication paths, it is necessary that the moving images for a transmission target are encoded and compressed to reduce a data volume.

For this type of codec for the moving image that is well known before, for example, MPEG (Moving Picture Experts Group) -2, MPEG-4, and AVC (Advanced Video Coding) are named. In these codecs, since processes for taking the correlation between pictures and processes for motion compensation are performed, a codec delay in association with signal processing occurs for about 0.1 seconds to 0.5 seconds. In addition, in these codecs, since compressed bit streams have the correlation between pictures, when a loss occurs in a certain picture, the loss is propagated to the subsequent picture, and the influence of the loss becomes great on image quality deterioration.

On the other hand, since compression is performed in pictures in DV (Digital Video), JPEG (Joint Photographic Experts Group), JPEG2000, the codec delay is suppressed in a single picture, and the influence due to the loss is closed within the picture. Consequently, these codecs are suited for implementing transmission with a small delay in radio communication paths and for improving error tolerance in communication paths.

For example, in JPEG2000, discrete wavelet transformation (hereinafter, simply referred to as "wavelet transformation") is used. In discrete wavelet transformation, for a base band signal that is an original image, one-dimensional wavelet convolution is applied to individual horizontal pixel rows, and the image is divided into two sub-images, a sub-image including low frequency information and a sub-image including high frequency information. Moreover, for each of the sub-images, the similar convolution is applied to individual vertical pixel columns, and the images are divided into two sub-images, sub-images with low frequency information and high frequency information.

Consequently, as shown in FIG. 1, a base band signal 1 that is an original image are decomposed into four subbands, that is, four sub-images (HH, HL, LH and LL). In addition, each of the sub-images has one-fourth of the size of the original image, and includes the number of data points that is one-fourth of the original image. Moreover, subscripts corresponding to the sub-images each indicate signal frequency components corresponding to the vertical and horizontal pixels. For example, (1) a sub-image HL includes high frequency image information from horizontal wavelet convolution and low frequency image information from vertical wavelet convolution, and (2) a sub-image LH includes low frequency image information from horizontal wavelet convolution and high frequency image information from vertical wavelet convolution.

Such wavelet transformation is repeatedly applied to an obtained sub-image LL. In other words, as shown in FIG. 1, suppose an original image is subjected to wavelet transformation to obtain sub-images 1HH, 1HL, 1LH, and 1LL (not shown) at the first decomposition level. The sub-image 1LL is further subjected to wavelet transformation, and divided into sub-images 2HH, 2HL, 2LH, and 2LL (not shown) at the second decomposition level. The sub-image 2LL is further subjected to wavelet transformation, and divided into sub-images 3HH, 3HL, 3LH, and 3LL at the third level. As described above, wavelet transformation is repeatedly performed, and in a transformed signal 2, the sub-images have a hierarchical structure.

As described above, in sending image data compressed by using wavelet transformation, there is a method in which all data in a single row at a single decomposition level (as the same row of the subband (for example, 3HL, 3LH, and 3HH) is formed into a block of the adjacent row) is together transmitted, whereby an image is made visible in advance during transmission as well as the transmission is allowed to finish at earlier time when the image is not a desired one (for example, see Patent Reference 1 (JP-A-8-242379)).

In the case of this method, for example, in the transformed signal 2 subjected to wavelet transformation and having the hierarchical structure as shown in FIG. 2, the individual rows of a sub-image 2LL are transmitted from above in order of 2LL-1, 2LL-2 and so on. Subsequently, the individual rows of a sub-image 2HL, a sub-image 2LH, and a sub-image 2HH are in turn transmitted (for example, in order of 2HL-1, 2LH-1, 2HH-1, 2HL-2, 2LH-2, 2HH-2 and so on). Then, the individual rows of a sub-image 1HL, a sub-image 1LH, and a sub-image 1HH are in turn transmitted from above.

In addition, a coding system with a small delay is proposed as a codec to implement a small delay in which JPEG2000 is split into tiles for coding (for example, see Non-Patent Reference 1 (KDDI R & D Laboratories, "JH-3000N", Product Catalog, April, 2006)). This is a method in which a single screen is split into a plurality of tiles and each row is encoded in parallel. A single tile is compressed as similar to a single JPEG2000 image. Therefore, it can perform processing in the particle size finer than that of a picture, and the codec delay can be suppressed to a single picture or below.

Moreover, there is a codec technique using line based wavelet transformation. This technique is that horizontal wavelet transformation is performed every time when a single line of the base band signal of the original image is scanned, and vertical wavelet transformation is performed every time when a certain line is read. For example, suppose vertical wavelet transformation is performed for every eight lines of the base band, in the case of three wavelet decomposition levels, with respect to these eight lines, a single line of a lowest sub-image 3LL, a single line of each of subbands 3H (3HL, 3LH and 3HH) at the next lowest level, two lines each of the subbands 2H (2HL, 2LH and 2HH) at the subsequent level, and four lines of a highest level 1H (for each of 1HL, 1LH and 1HH).

In addition, a set of lines of the subband is referred to as a precinct. In other words, a single precinct includes the plurality of lines that is a processing unit of line based wavelet transformation. Moreover, a set of lines of the subband at each level in the precinct (except 3LL, it is formed of three subbands) is referred to as an align unit. In other words, a single precinct of the subband is configured of four align units (3LL, 3H, 2H and 1H).

For example, a precinct (a shaded area in the drawing) having eight lines in the base band signal 1 on the left side in FIG. 3 is configured as shown on the right side in FIG. 3 as four lines for each of 1HL, 1LH, and 1HH in 1H in the transformed signal 2 after line based wavelet transformation (a shaded area in the drawing), two lines for each of 2HL, 2LH, and 2HH in 2H (a shaded area in the drawing), and a single line for each of 3LL, 3HL, 3LH and 3HH (a shaded area in the drawing).

As similar to the tile splitting of JPEG2000, the process of line based wavelet transformation can be performed by decomposing a single picture in finer particle size, and this transformation is used to intend to make delay small. However, in the case of line based wavelet transformation, since it is the split by a wavelet coefficient, not the split in accordance with the base band signal 1, different from the tile splitting of JPEG2000, the transformation also has the characteristic that degraded image quality like block noise will not occur on the border between tiles.

In the case in which data compressed by using the line based wavelet transformation like this is sent through radio communication paths, as a method of increasing the resistance against losses, data in lower frequency bands can be in turn sent as similar to the existing transmission of progressive coded data (JPEG2000 code streams).

SUMMARY OF THE INVENTION

Supposing that line based wavelet transformation is applied to HD (High-Definition) video having a considerably small data volume of a single precinct and of a width of 1920 pixels and a height of 1080 pixels at 60 fps (frame per second), (1) the data volume of a single precinct becomes about 1/135 (=8/1080) of the data volume of a single picture, and (2) the data size of a single precinct becomes about 1080 bytes (=35*1000*1000/8/30/135) when the encoding rate is set to 35 Mbps (Bit per Second).

In the case in which this single precinct of data is set as a single packet and the packet loss occurs under this assumption, data corresponding to eight lines of the base band signal is lacked in a strip shape, causing a problem that degraded image quality is likely to be perceived.

In addition, in order to make use of the characteristics of the wavelet, it is necessary to send 3LL, 3H, 2H, and 1H in separate packets. However, a small packet size causes an increased overhead of the physical layer in radio, the header of the MAC (Media Access Control) layer (PHY/MAC), and payload headers (including information about the precinct number, identification between 3LL/3H/2H/1H, information about Y/C and so on). Moreover, an increased packet number might causes the frequent occurrence of IFS (Inter Frame Space), RTS (Request to Send), and CTS (Clear to Send), leading to degraded transmission efficiency.

Therefore, in order to suppress degraded image quality as small as possible and to efficiently transmit data with a small delay, such architecture is necessary that considers the balance therebetween.

In addition, the method according to Patent Reference 1 is the method that sends image data compressed by using wavelet transformation on communication channels at relatively low speed in which the block of adjacent rows according to this method is a collection of the same lines at the same level in each subband generated by wavelet transformation with respect to the entire original image 1. Even though this transmission method is applied to image data compressed by using line based wavelet transformation that performs wavelet transformation based on lines, data volume is small particularly in low frequency components (such as 3LL), causing a problem that the transmission efficiently might be decreased. In other words, the transmission method described in Patent Reference 1 is applied to image data compressed by using line based wavelet transformation, this problem will not be solved that a data volume is small and the transmission efficiency is decreased.

It is desirable to suppress degraded image quality as small as possible and to process data efficiently with a small delay for transmission or reproduction. An embodiment of the invention adopts a method including the steps of: splitting the image data supplied in units of precincts that are the set of lines to be a unit of processing for the line based wavelet transformation for every frequency component, and storing a plurality of precincts of image data for every frequency component; reading and packetizing the stored plurality of the precincts of image data for each of the frequency components; and sending the packetized plurality of the precincts of image data for each of the frequency components to the another device.

In addition, an embodiment of the invention adopts a method including the steps of: splitting the image data supplied in units of precincts that are the set of lines to be a unit of processing for the line based wavelet transformation for every frequency component, and storing a plurality of precincts of image data for every frequency component; reading and decoding the stored plurality of the precincts of image data for each of the frequency components; and outputting the decoded plurality of the precincts of image data for each of the frequency components.

According to an embodiment of the invention, image data can be processed. Particularly, degraded image quality can be suppressed as small as possible, and data can be processed efficiently with a small delay for transmission or reproduction.

BRIEF DESCRIPTION OF THE DRAWINGS

FIG. 20 shows a diagram depicting an exemplary configuration of a reproducing unit to which an embodiment of the invention is adapted; and FIG. 21 shows a diagram depicting an exemplary configuration of a personal computer to which an embodiment of the invention is adapted.

DETAILED DESCRIPTION OF THE INVENTION

In an embodiment of the invention, in sending image data compressed by line based wavelet transformation, data is stored in a plurality of blocks (a plurality of precincts) until the data reaches the data volume in suitable transmission efficiency, and then the data is packetized collectively for transmission. At this time, even though data is sent through communication paths such as radio communication paths in which communication errors relatively tend to occur, a real time resending mechanism is used in order to improve received image quality as well as priority control is performed that lower frequency components (components that highly contribute to improving image quality) are reliably delivered for transmission.

Figure 1:
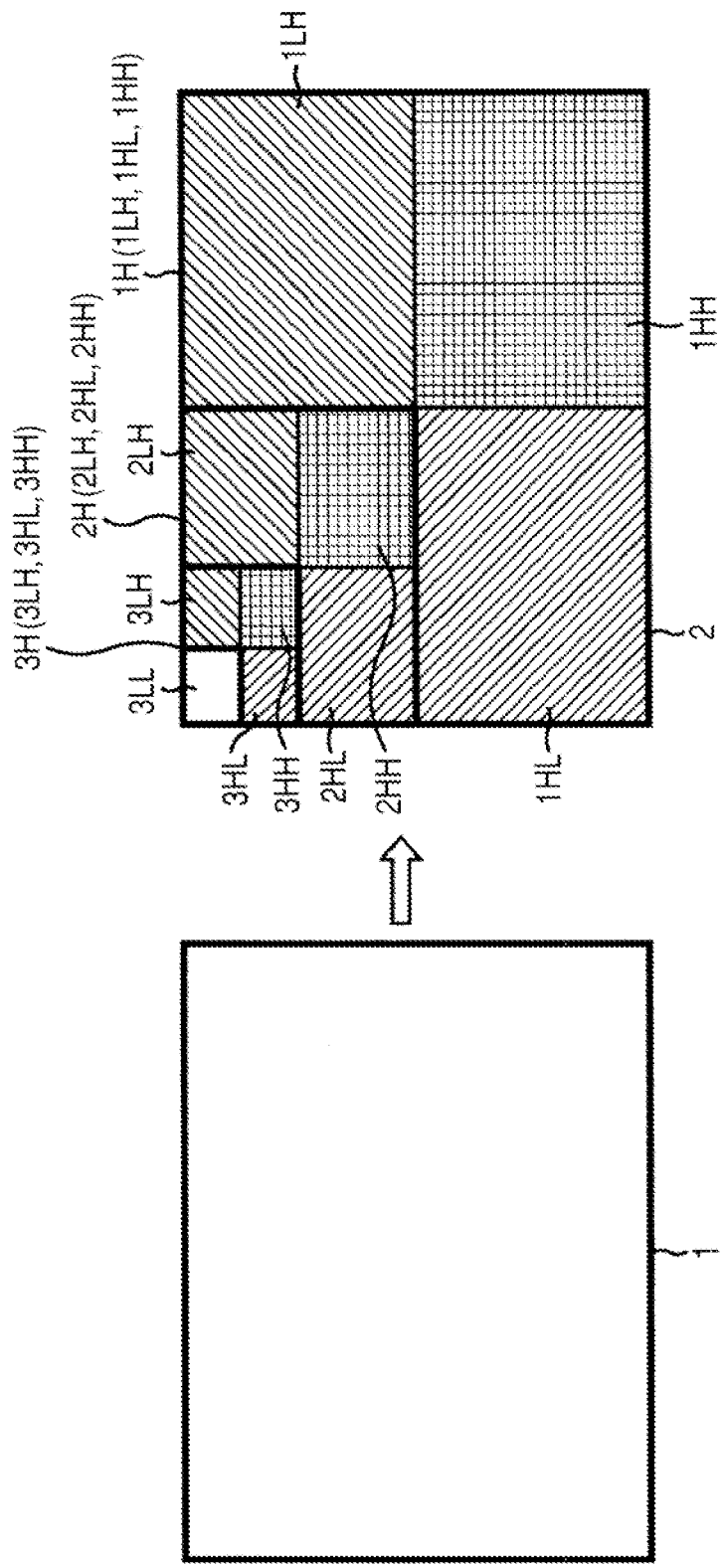
FIG. 1 shows a diagram illustrative of the manner of wavelet transformation.
Figure 2:
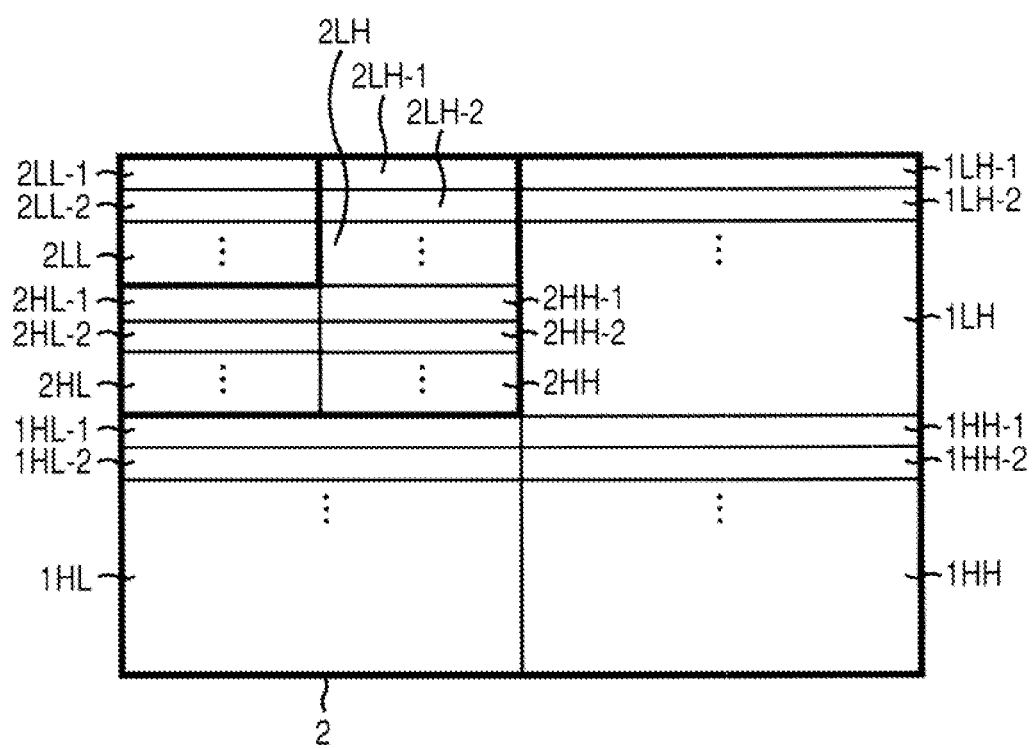
FIG. 2 shows a diagram illustrative of the manner of sending data subjected to wavelet transformation together with all data in a single row at a single decomposition level.
Figure 3:
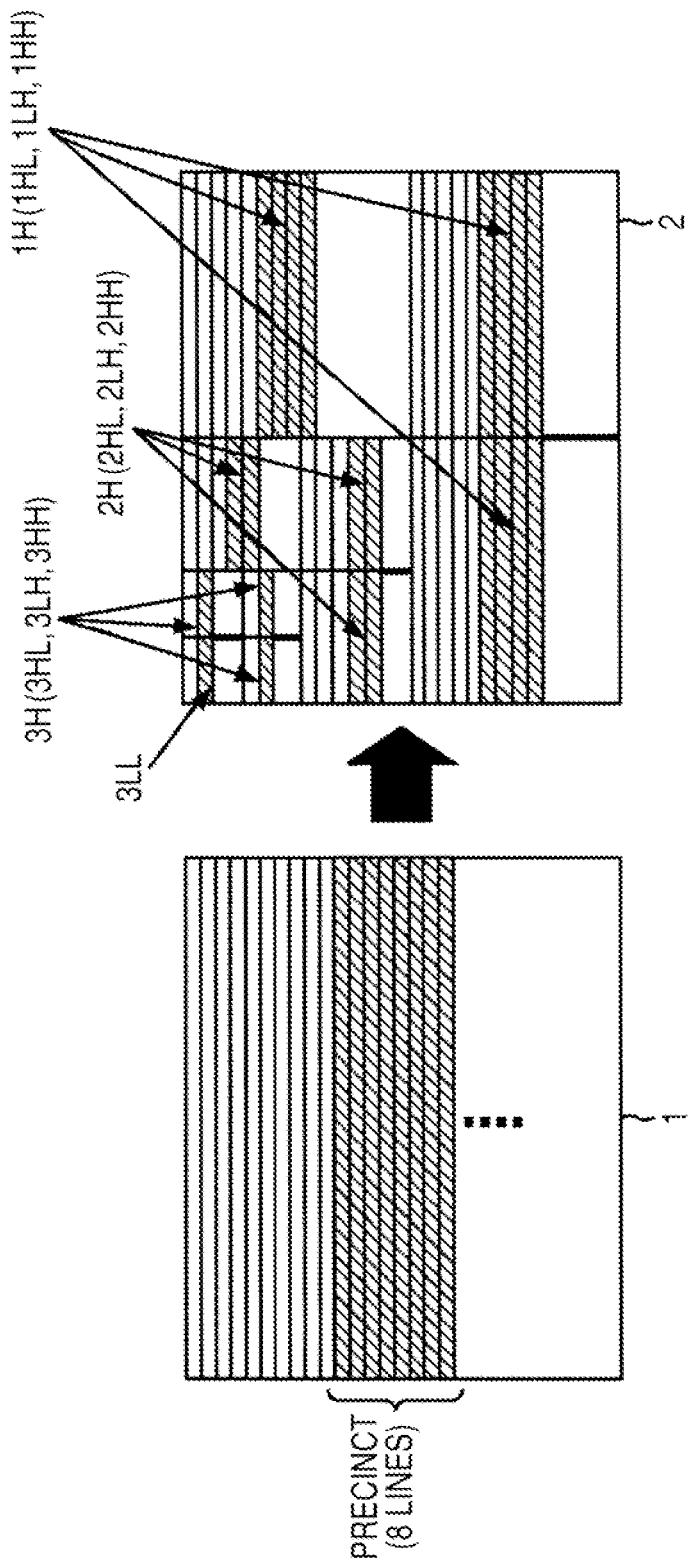
FIG. 3 shows a diagram illustrative of an exemplary manner of line based wavelet transformation.
Figure 4:
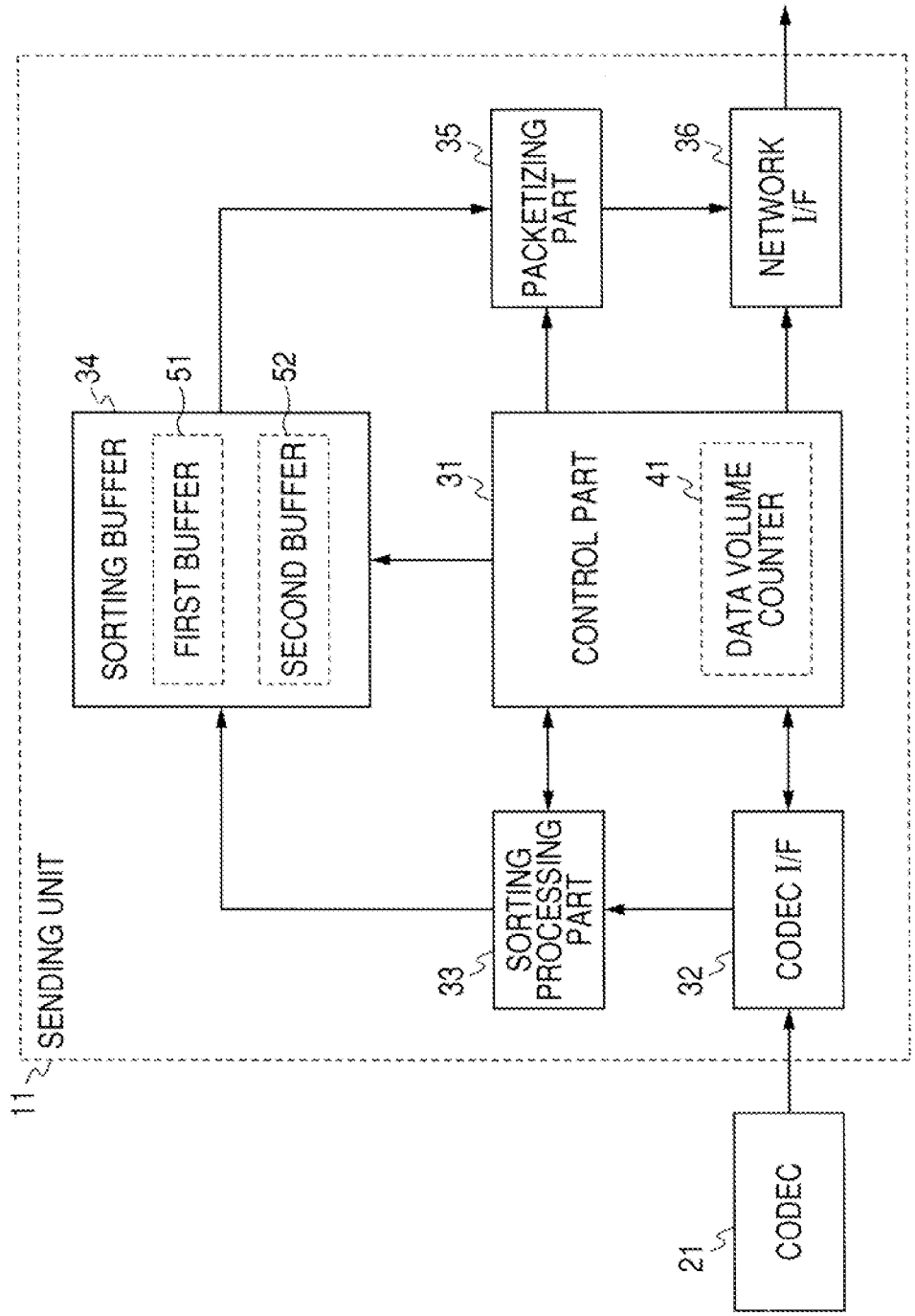
FIG. 4 shows a diagram depicting an exemplary configuration of a sending unit to which an embodiment of the invention is adapted.

FIG. 4 shows a diagram depicting an exemplary configuration of a sending unit to which an embodiment of the invention is adapted.

A sending unit 11 is a unit that packetizes image data subjected to line based wavelet transformation in a codec 21 and sends the packet to other units (not shown) via network (not shown) typified by a LAN (Local Area Network) and the Internet.

The sending unit 11 has a control part 31 which controls the operation of individual parts of the sending unit 11, a codec interface (I/F) 32 which acquires image data from the codec 21 in units of precincts, a sorting processing part 33 which sorts image data acquired from the codec interface 32 to every frequency component, that is, a block (a sub-image) at the same frequency level and stores it at a predetermined memory position in a sorting buffer 34, a sorting buffer 34 which stores therein data sorted by the sorting processing part 33, a packetizing part 35 which acquires data sorted by the sorting buffer 34 from lower frequency components and in turn packetizes them, and a network interface (I/F) 36 which sends data (packets) packetized in the packetizing part 35 to the network.

The control part 31 controls the codec interface 32 to acquire image data subjected to line based wavelet transformation in the codec 21 in units of precincts, and controls the sorting processing part 33 to sort the acquired image data for every frequency component and to store it in the sorting buffer 34. In other words, in the sorting buffer 34, a plurality of the precincts of data is collected for every frequency component (as the storage area is divided) and stored.

More specifically, for example, in the case in which data is stored with not sorting, the individual items of data are arranged in the stored order with respect to the addressing order of the storage area in the sorting buffer 34. In contrast to this, in the case in which the control part 31 controls the sorting processing part 33 as described above, the individual items of data are arranged in order different from the stored order (as collected for every frequency component) with respect to the addressing order.

In addition, the control part 31 controls the packetizing part 35 to read and packetize the image data stored in the sorting buffer 34 in the sorted order (to read a plurality of the precincts from lower frequency components to higher frequency components for every frequency component), and controls the network interface 36 to sequentially output the packets to the network. In addition, in the case in which ACK is not sent from the receiving side, the control part 31 controls the packetizing part 35 and the network interface 36 to again read data out of the sorting buffer 34 and packetize data for transmission as necessary (it allows resending packets).

The control part 31 has a data volume counter 41 therein which counts the data volume of the image data stored in the sorting buffer 34, and the control part controls the individual parts based on the count value.

The sorting buffer 34 has two buffers, a first buffer 51 and a second buffer 52, in which data is written to one of the buffers and data stored in the other buffer is read at the same time.

The control part 31 controls switching of the input and output of the first buffer 51 and the second buffer 52 based on the count value of the data volume counter 41, and allows the packetizing part 35 to acquire image data from the other buffer while it is allowing the sorting processing part 33 to store image data in one of the buffers.

The control part 31 switches input when the sorting processing part 33 stores a predetermined data volume of image data (for example, the maximum data volume storable in the buffer) in one of the buffers, and allows the other buffer to store data therein. In addition, at this time, the control part 31 also switches output at the same time, and allows the packetizing part 35 to read image data out of the buffer in which a predetermined data volume of image data is stored (the buffer that has stored data before switched).

The control part 31 repeatedly switches the input and output of the sorting buffer 34, and allows data storage as well as packetizing data at the same time.

In addition, at the time of switching, the control part 31 terminates the packetizing process done by the packetizing part 35 for data in the buffer before switched, and the output of the packets done by the network interface 36, and allows switching new processes for data to the buffer.

With this configuration, a plurality of the precincts can be collectively processed, and data can be packetized for every frequency component for transmission. Therefore, the sending unit 11 can secure the data volume (the packet size) of a single packet, and thus the degradation of the transmission efficiency can be suppressed. In addition, in the case in which real time processing is secured in data transmission, for data that has not been sent within a predetermined processing time (for example, a time period necessary to decode a plurality of the precincts of data stored in the buffer), it is sometimes necessary to give up transmission, but because of the configuration in which lower frequency components are in turn sent and packets are resent as well, it is possible to surely transmit the packets corresponding to low frequency components within the time period. Consequently, even though data is lost during transmission, it is possible to reduce the influence on images.

Thus, the sending unit 11 can suppress degraded image quality as small as possible, and can send data efficiently with a small delay.

Next, a more specific process flow will be described.

First, an exemplary flow of the transmission control process done by the control part 31 will be described with reference to a flow chart shown in FIG. 5.

When the transmission control process is started, in Step S1, the control part 31 initializes the count value of the data volume counter 41, and in Step S2, it controls the sorting processing part 33 to start the data storage process in which image data that has been subjected to line based wavelet transformation in the codec 21 is acquired by the codec interface 32 for every frequency component, and the data is sorted and stored in the first buffer 51 or the second buffer 52 in the sorting buffer 34. The detail of the data storage process will be described later.

In Step S3, the control part 31 uses the data volume counter 41 to count data stored by the data storage process. In Step S4, based on the count value of the data volume counter 41, the control part 31 determines whether a predetermined data volume is stored in the first buffer 51 or the second buffer 52 in the sorting buffer 34.

The first buffer 51 and the second buffer 52 each have the storage area in which a plurality of the precincts of image data can be stored. For example, in the case in which a single precinct is eight lines and the buffer can store n precincts of data (n is an integer equal to 2 or greater), the first buffer 51 and the second buffer 52 each have the storage area that can store 8×n lines of data.

In Step S4, when the control part 31 determines that a predetermined data volume has not been stored in the buffer for data storage and more image data can be stored therein based on the count value of the data volume counter 41, it returns the process to Step S2, and repeats the process steps after that. In addition, in Step S4, if the control part determines that the maximum data volume of image data storable in the buffer (a plurality of the precincts of data) and it is difficult to store data more, the control part 31 advances the process to Step S5.

In Step S5, the control part 31 controls the packetizing part 35 to end the running packetizing process. Moreover, in Step S6, the control part 31 ends the running packet sending process.

Then, in Step S7, the control part 31 switches the input and output of the sorting buffer 34. For example, while the sorting processing part 33 is allowed to store data in the first buffer 51 and the packetizing part 35 is allowed to read out data stored in the second buffer 52, the control part 31 allows the sorting processing part 33 to store data in the second buffer 52, and allows the packetizing part 35 to read out data stored in the first buffer 51. In the opposite case, the control part switches in similar ways.

When switching the input and output of the buffer is finished, in Step S8, the control part 31 controls the packetizing part 35 to start the packetizing process for data newly stored in the buffer, and in Step S9, it controls the network interface 36 to start the packet transmission process of sending the packetized packets.

In Step S10, the control part 31 determines whether data supply from the codec 21 is finished. If it determines that it is not finished, it returns the process to Step S1, and repeats the process steps after that. In addition, in Step S10, if the control part 31 determines that data supply from the codec 21 is finished, it ends the transmission control process.

Next, an exemplary flow of the data storage process started in Step S2 in FIG. 5 will be described with reference to a flow chart shown in FIG. 6.

In Step S31, the sorting processing part 33 is controlled by the control part 31 to acquire data obtained from the codec 21 in units of precincts through the codec interface (I/F) 32. In Step S32, it splits data for every precinct into frequency components, and in Step S33, it writes data in a predetermined memory area of the first buffer 51 or the second buffer 52 for every frequency component, and it ends the data storage process.

The codec 21 supplies data after transformed to the spending unit 11 at every time when line based wavelet transformation is performed, that is, in units of precincts. The codec interface 32 acquires the data in the supplied order (that is, in units of precincts). The data in units of precincts includes the individual frequency components. For example, in the case in which the codec 21 decomposes data into three levels, data acquired by the codec interface 32 contains four frequency components in total including the lowest band (sub-images 1H, 2H, 3H, and 3LL at individual frequency levels).

The sorting processing part 33 splits data in each precinct for every frequency component, that is, the sub-images 3LL, 3H, 2H, and 1H at the individual frequency levels, and stores the individual frequency components in different areas in the sorting buffer 34 (for example, the individual frequency components are stored in different areas in the storage area of the first buffer 51, and it is similar in the case of storing data in the second buffer 52) so that in the packetizing process, described later, the same frequency bands in a plurality of the precincts can be easily packetized.

Figure 7:
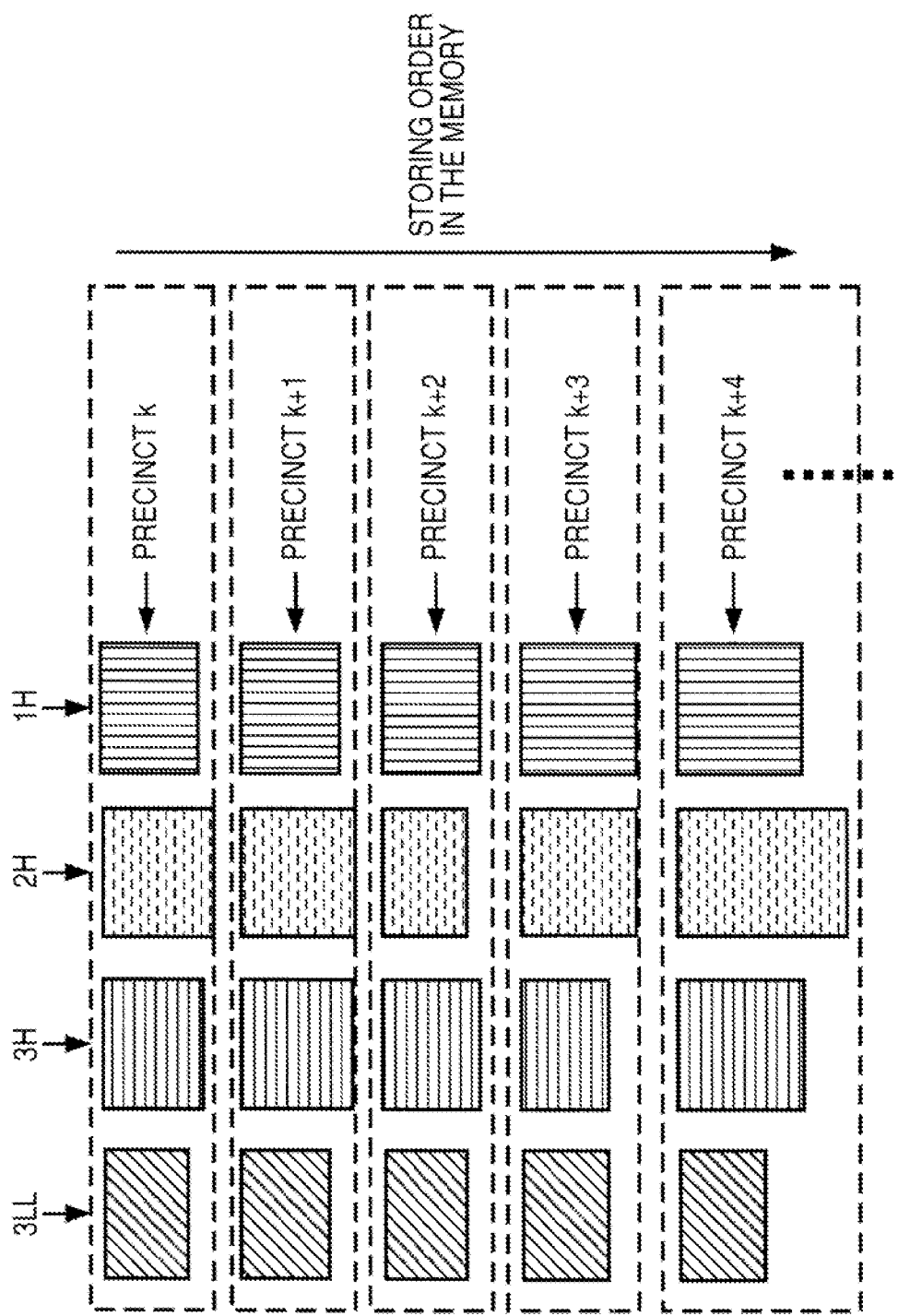
FIG. 7 shows a schematic diagram illustrative of the manner of data write to a sorting buffer.

FIG. 7 shows a diagram illustrative of an exemplary manner of storing data in the sorting buffer 34 (the first buffer 51 and the second buffer 52).

As shown in FIG. 7, the sorting processing part 33 stores data in the first buffer 51 or the second buffer 52 in the sorting buffer 34 for every precinct in order that the codec interface 32 acquires data like precinct k, precinct k+1, precinct k+2, precinct k+3, precinct k+4, and so on. However, at this time, the sorting processing part 33 stores the frequency components in each precinct in different areas. In other words, the sorting processing part 33 stores data for every frequency component and distinguishes the storage area so as to collect 1H, 2H, 3H, and 3LL in the individual precincts.

Figure 8:
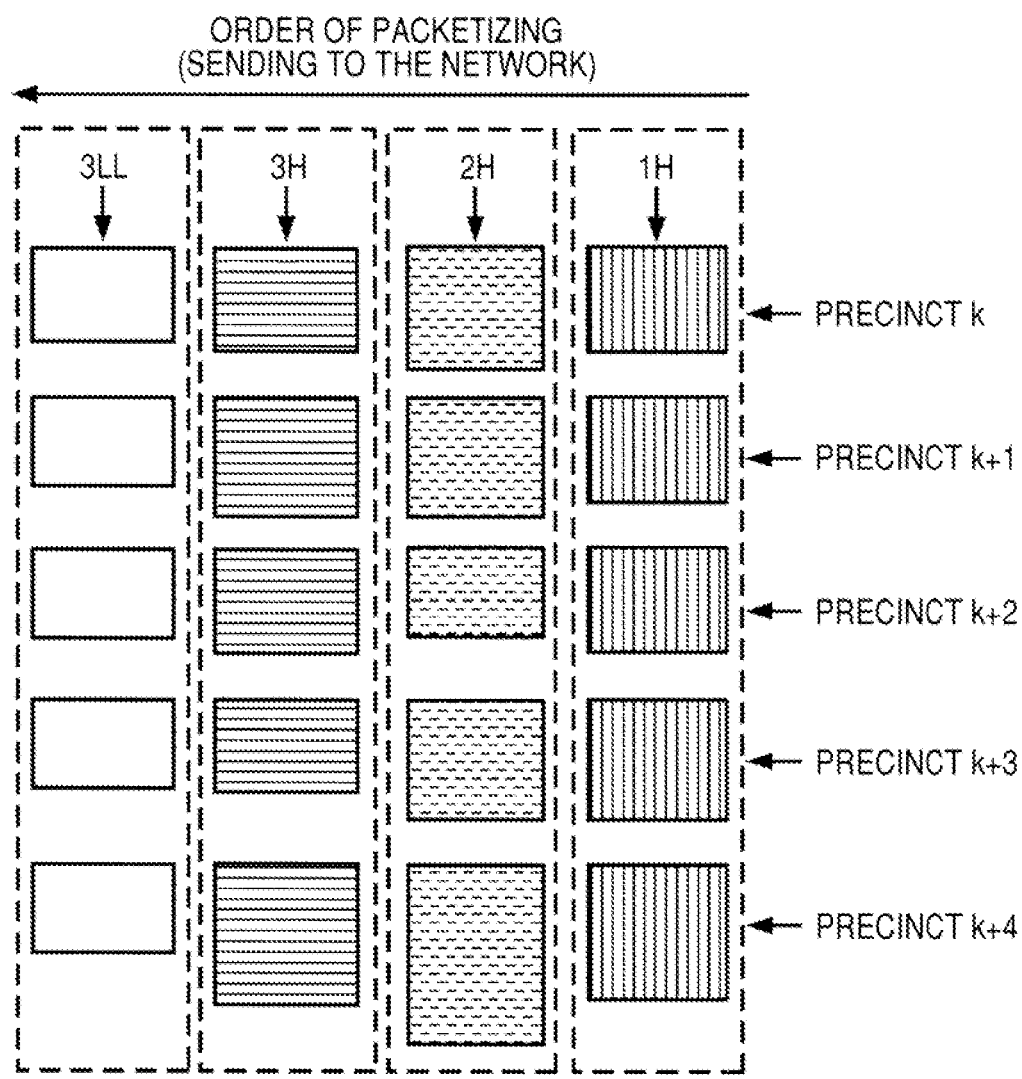
FIG. 8 shows a schematic diagram illustrative of the manner of data read from the sorting buffer.

As described above, as shown in FIG. 8, a plurality of the precincts of data managed in a matrix is read out from lower frequency components, for example, by the packetizing part 35 for every frequency component (in order of 3LL, 3H, 2H and 1H). In other words, the packetizing process and the transmission process are performed in units of a plurality of the precincts.

Next, an exemplary flow of the packetizing process started in Step S8 in FIG. 5 will be described with reference to a flow chart shown in FIG. 9.

When the packetizing process is started as controlled by the control part 31, the packetizing part 35 in turn reads and packetizes a plurality of the precincts of data from lower frequency components out of the sorting buffer 34 (the first buffer 51 or the second buffer 52). In other words, the packetizing part 35 packetizes 3LL in Step S51, packetizes 3H in Step S52, packetizes 2H in Step S53, packetizes 1H in Step S54, and ends the packetizing process for data stored in the buffer.

Figure 10:
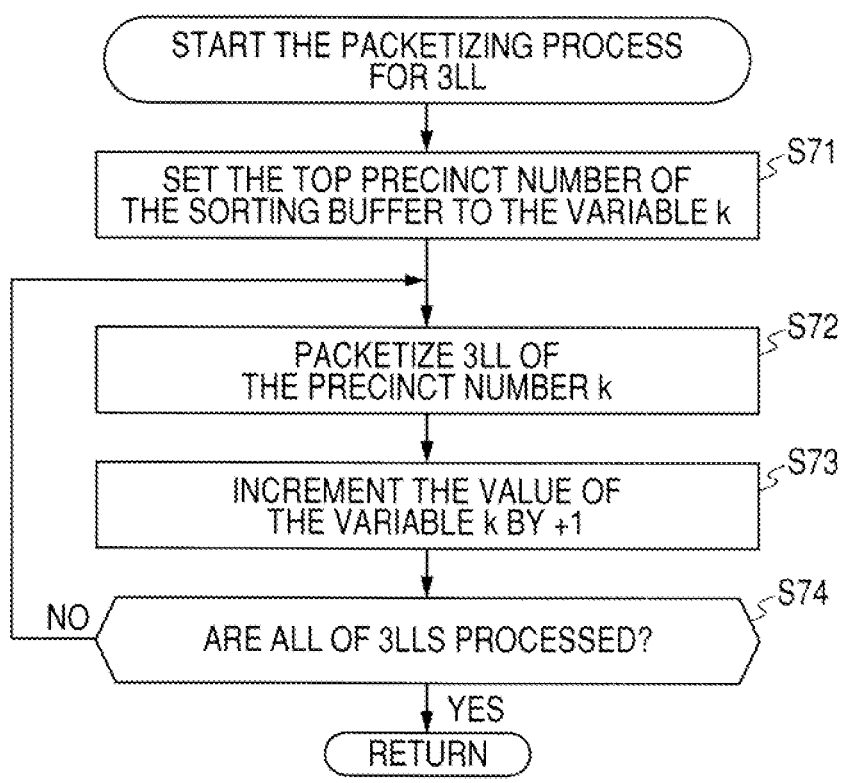
FIG. 10 shows a flow chart depicting an exemplary flow of a packetizing process for 3LL.

The packetizing process for 3LL performed in Step S51 will be described with reference to a flow chart shown in FIG. 10.

In Step S71, the packetizing part 35 sets the first precinct number assigned to data stored in the first buffer 51 or the second buffer 52 in the sorting buffer 34 to a variable k.

In Step S72, the packetizing part 35 packetizes 3LL having the precinct number k. In Step S73, it increments the value of the variable k by +1, and in Step S74, it determines whether 3LL in all the precincts inside the buffer is processed. If the packetizing part 35 determines that there is unprocessed data, it returns the process to Step S72, and repeats the process steps for the subsequent precinct. In other words, until the packetizing part 35 determines that all of 3LLs are processed in Step S74, it repeats the process steps of Step S72 to Step S74.

Figure 9:
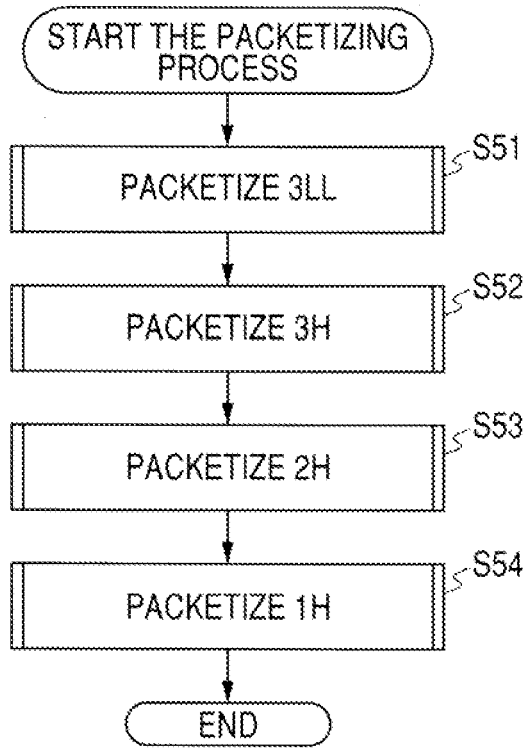
FIG. 9 shows a flow chart depicting an exemplary flow of a packetizing process.

In Step S74, if the packetizing part 35 determines that all of 3LLs are processed, it ends the packetizing process for 3LL, returns the process to Step S51 in FIG. 9, and allows processing the process steps after Step S52. For the individual frequency components of 3H, 2H, and 1H, the packetizing part 35 performs the packetizing process as similar to the packetizing process for 3LL. Thus, the detailed flow of the packetizing process done in Step S52 to Step S54 is the same as that in the flow chart shown in FIG. 10, omitting the descriptions.

Figure 11:
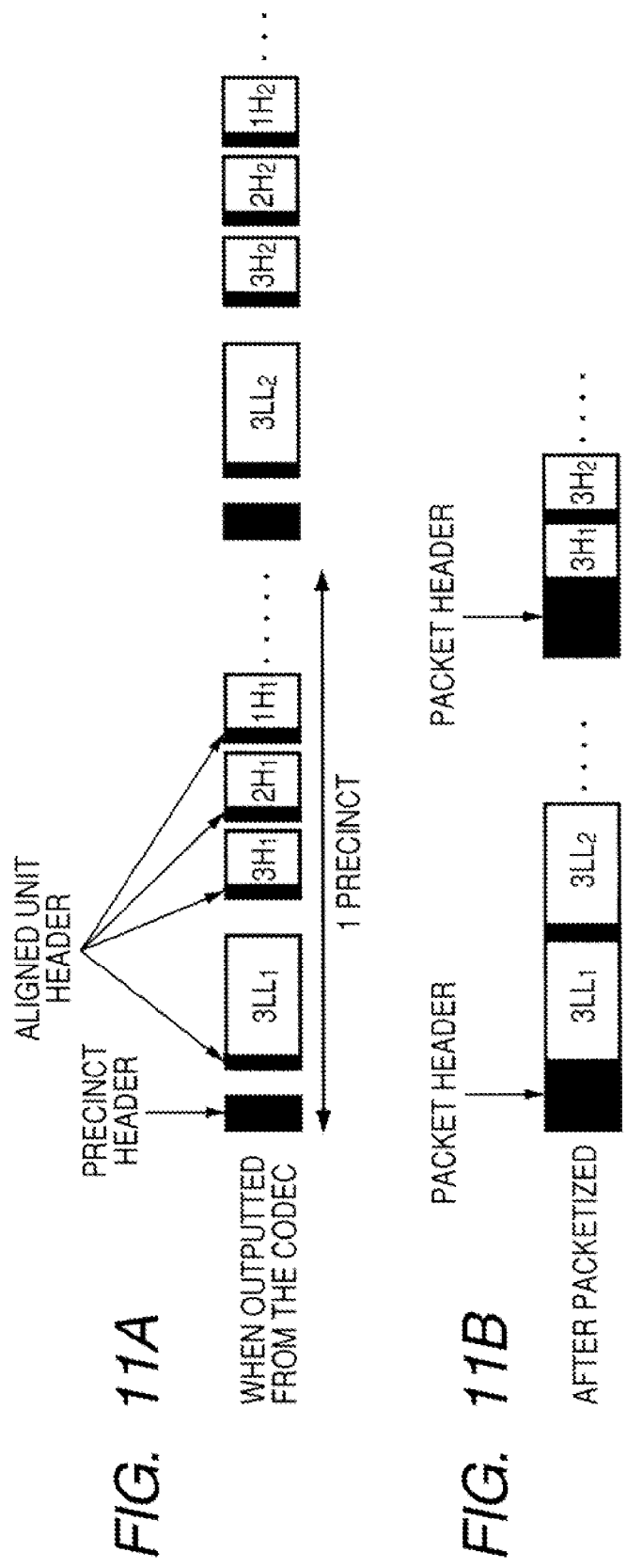
FIG. 11 shows a schematic diagram illustrative of the manner of transforming the data configuration.

According to the process steps, as shown in FIG. 11A, data is configured to be collected for every precinct when outputted from the codec 21. After packetized, as shown in FIG. 11B, a plurality of the precincts of data is packetized for every frequency component. In other words, after the codec, as shown in FIG. 11A, the individual frequency components in each precinct added with an align unit header are collected for every precinct by a precinct header. In contrast to this, after packetized, as shown in FIG. 11B, a plurality of the precincts of data is collected (packetized) for every frequency component by a packet header.

Figure 12:
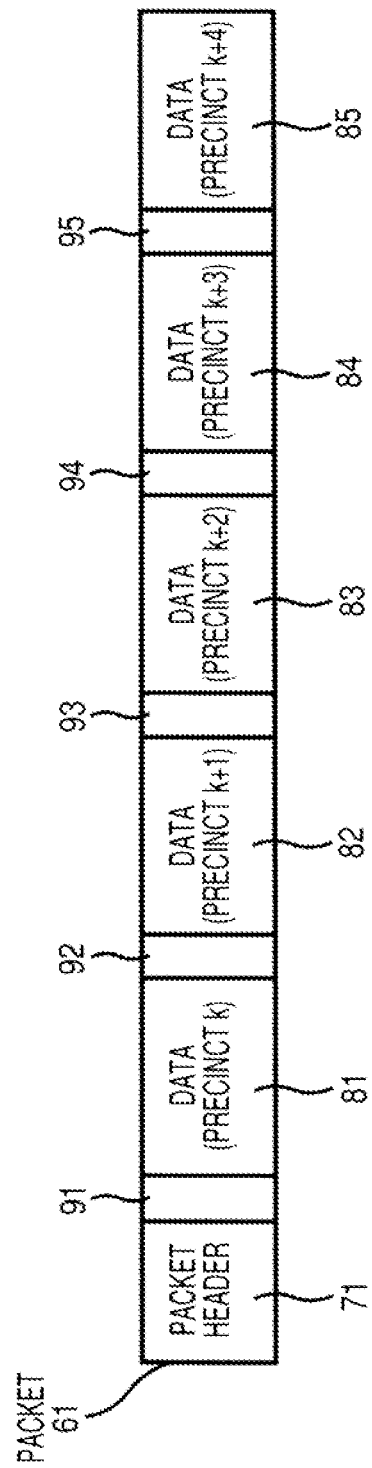
FIG. 12 shows a schematic diagram illustrative of an exemplary configuration of a packet.

FIG. 12 shows a diagram depicting an exemplary configuration in the case in which data is packetized for every five precincts. As shown in FIG. 12, a packet 61 is configured of a packet header 71, data 81 to data 85 that are items of data in each precinct, and sub-headers 91 to 95 added to data in each precinct. In other words, as shown in FIG. 12, in this case, a plurality of the precincts of data stored in the first buffer 51 or the second buffer 52 is collected as a single packet for every frequency component (in other words, four packets are generated in the case of three decomposition levels).

Figure 13:
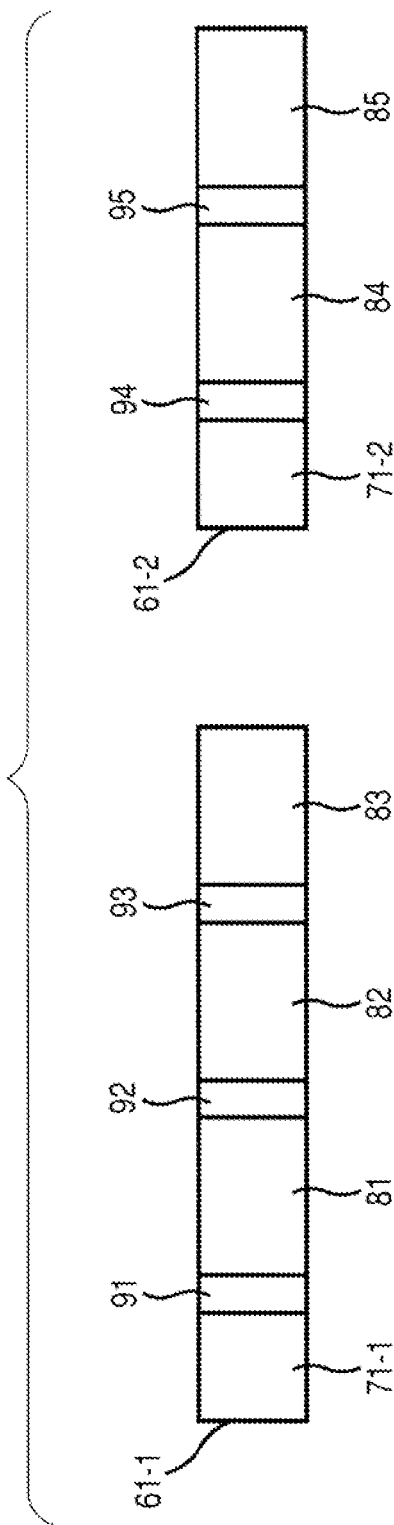
FIG. 13 shows a schematic diagram illustrative of another exemplary configuration of a packet.
Figure 14:
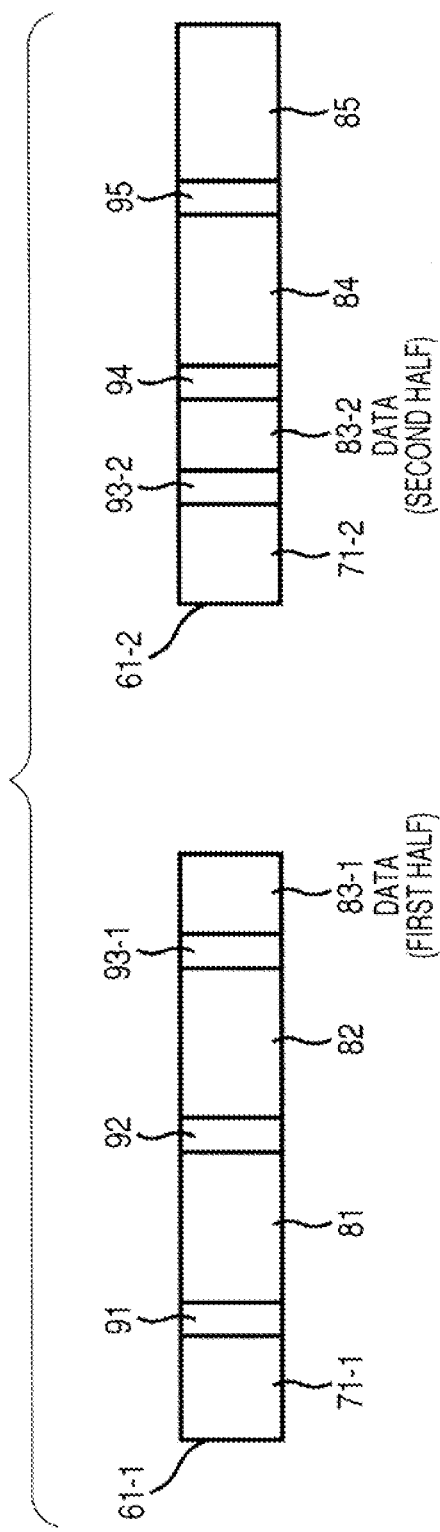
FIG. 14 shows a schematic diagram illustrative of still another exemplary configuration of a packet.
Figure 15:
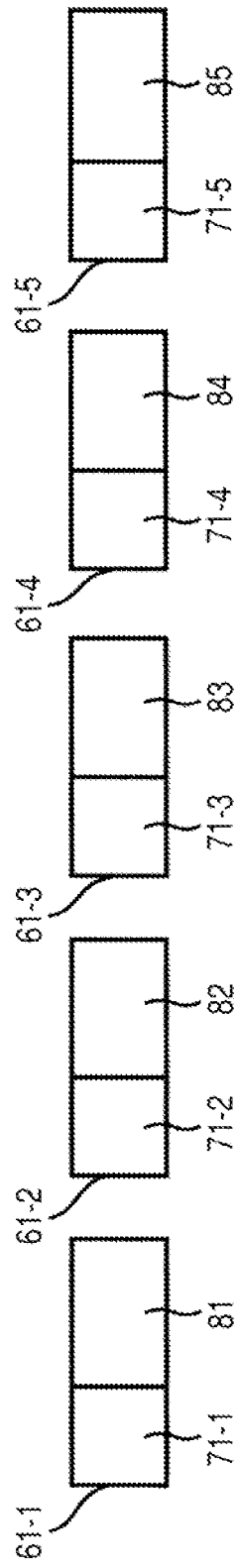
FIG. 15 shows a schematic diagram illustrative of yet another exemplary configuration of a packet.

In addition, as shown in FIGS. 13 to 15, the packetizing part 35 may generate of a plurality of packets from the individual frequency components of a plurality of the precincts of data stored in the first buffer 51 or the second buffer 52.

In the example shown in FIG. 13, data 81 to data 83 are packetized as a packet 61-1, and data 84 and data 85 are packetized as a packet 61-2. This splitting position may be any positions. For example, the data 81 is split from the data 82 to data 85. In addition, as shown in FIG. 14, the packetizing part 35 may split the data 83 into two portions, first data 83-1 and second data 83-2, and may generate a packet 61-1 including data 81, data 82, and (first) data 83-1, and a packet 61-2 including (second) data 83-2, data 84, and data 85. Moreover, as shown in FIG. 15, data 81 to data 85 may be of course packetized as different packets (packets 61-1 to 61-5).

Moreover, data may be packetized in patterns different from those described above, and a plurality of patterns may be of course combined. For example, data may be packetized in different patterns for every frequency component.

Next, the flow of the packet transmission process started by the process in Step S9 shown in FIG. 5 will be described with reference to flow chart shown in FIG. 16.

The network interface 36 is controlled by the control part 31, and sends the packets for every frequency component in order of the packets packetized in the packetizing part 35, that is, from lower frequency components. In other words, the network interface 36 sends the packet for 3LL in Step S91, the packet for 3H in Step S92, the packet for 2H in Step S93, and the packet for 1H in Step S94. The network interface 36 ends the process in Step S94, and then it ends the packet transmission process.

An exemplary flow of the packet transmission process for 3LL done in Step S91 shown in FIG. 16 will be described with reference to a flow chart shown in FIG. 17.

When the packet transmission process for 3LL is started, in Step S111, the network interface 36 acquires the packet for 3LL from the packetizing part 35, and in Step S112, it sends the acquired packet for 3LL to the network.

In Step S113, the network interface 36 determines whether a flash request for a sending queue is acquired from the control part 31. When a predetermined data volume is stored in the first buffer 51 or the second buffer 52 in the sorting buffer 34 in which the sorting processing part 33 stores data, in Step S6 in FIG. 5, the control part 31 supplies the flash request for the sending queue to the network interface 36, whereby it makes a request for deleting (flashing) the descriptions in the sending queue of the network interface 36 to discard the packets that have not been sent yet.

In Step S113, the network interface 36 determines whether the flash request is acquired from the control part 31. If the network interface 36 determines that the flash request is not acquired, it advances the process to Step S114, and determines whether the ACK signal (response) is acquired from the receiver that is the destination of the packets. For example, if it determines that ACK is not acquired even though a predetermined time period has elapsed, it advances the process to Step S115, and resends the packet for 3LL.

After the network interface 36 resends the packet, it advances the process to Step S116. In addition, in Step S114, if the network interface 36 determines that ACK is acquired from the receiver, it omits the process in Step S115, and advances the process to Step S116.

In Step S116, the network interface 36 determines whether all the packets for 3LL have been sent. If it determines that the transmission has not been finished, it returns the process to Step S111, and repeats the process steps after that to the subsequent packet. In addition, in Step S116, the network interface 36 determines that all the packets for 3LL have been sent, ends the packet transmission process for 3LL, returns the process to Step S91 in FIG. 16, and allows performing the process steps after Step S92.

In other words, in transmission via the network, ARQ (Automatic Repeat reQuest) is used to recover the lost packet. In ARQ control, for example, in the case in which data of 3LL in the low frequency band is not delivered to the receiving side (if it is difficult to receive ACK), the network interface 36 repeatedly resends the same packet, and it does not send the packet for 3H that is the subsequent frequency component until all the packets for 3LL are delivered in the receiver (Step S92 in FIG. 16).

Figure 16:
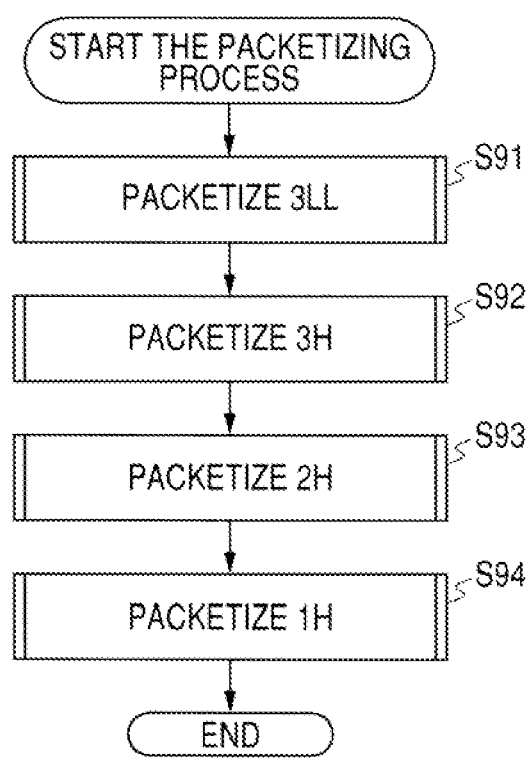
FIG. 16 shows a flow chart depicting an exemplary flow of a packet sending process.

In addition, in Step S113, if the network interface 36 determines that the flash request is acquired, it advances the process to Step S117, and ends the packet transmission process shown in the flow chart in FIG. 16 at that point. In other words, in Step S6 in FIG. 5, when the network interface 36 acquires the flash request from the control part 31, it deletes (flashes) the sending queue based on the request to end the transmission process for the precinct group that is the current process target. In other words, in this case, the process steps after Step S92 in FIG. 16 are omitted. The control part 31 controls the packetizing part 35 and the network interface 36 to perform the process steps after Step S7 in FIG. 5, to switch the input and output of the sorting buffer 34, to read data out of a new buffer, and to packetize it for transmission.

Figure 17:
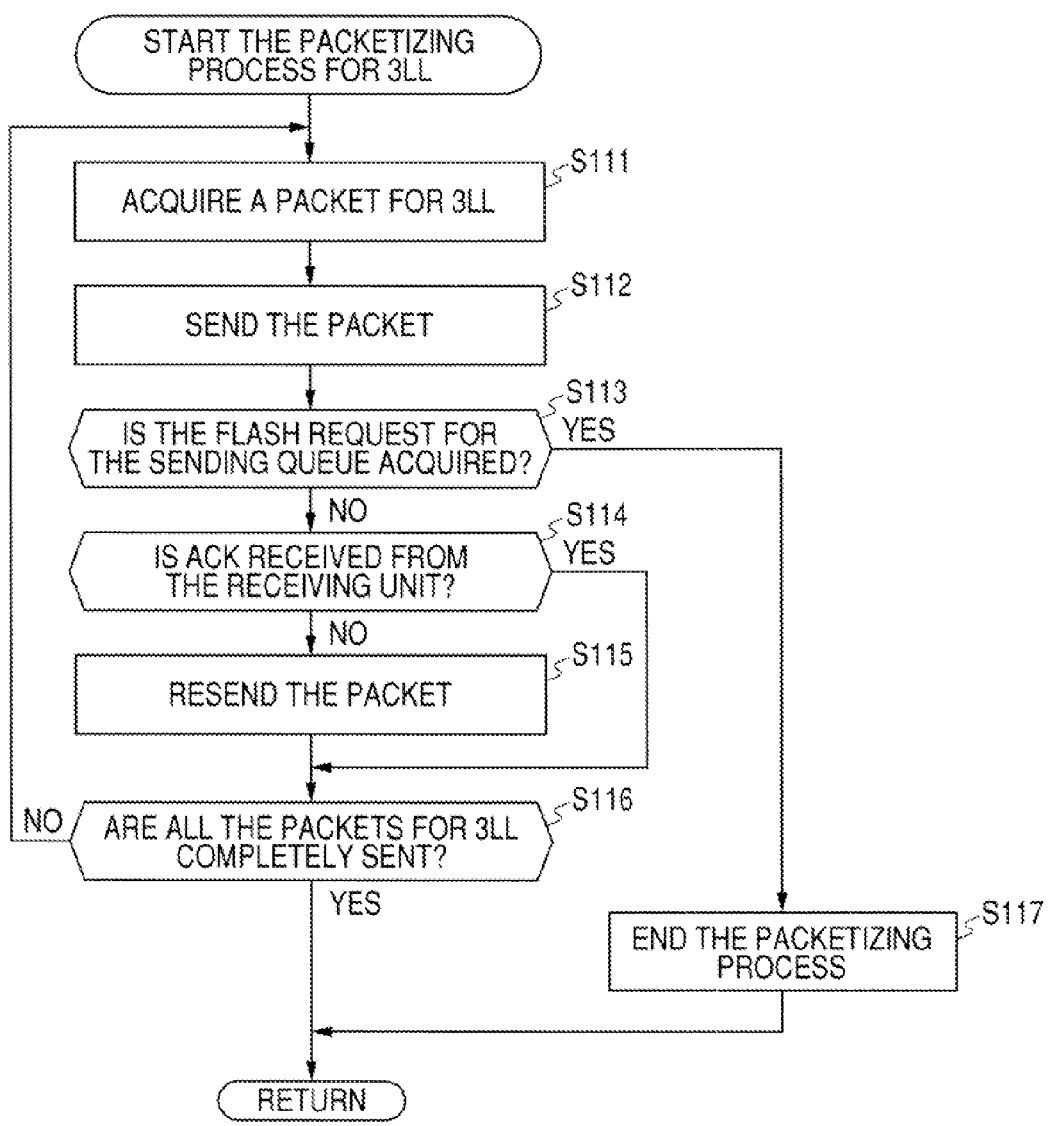
FIG. 17 shows a flow chart depicting an exemplary flow of a packet the transmission process for 3LL.

After the packet transmission process for 3LL is ended, the network interface 36 is controlled by the control part 31, and it processes the individual items of data of 3H, 2H, and 1H as similar to the packet transmission process for 3LL shown in the flow chart in FIG. 17. In other words, the packet transmission process similar to the process shown in FIG. 17 (for the individual sub-images) is performed for each of Step S91 to Step S94 shown in FIG. 16, but these descriptions are omitted. In addition, in the case in which the packet transmission process is forcedly ended by the process in Step S117 shown in FIG. 17, the process steps after that in FIG. 16 are omitted. For example, in the case in which the process shown in FIG. 17 is performed as the process of sending the packet for 2H in Step S93 in FIG. 16, if the packet transmission process is ended by the process in Step S117, the packet transmission process shown in FIG. 16 is forcedly ended, and the process in Step S94 is omitted.

Figure 5:
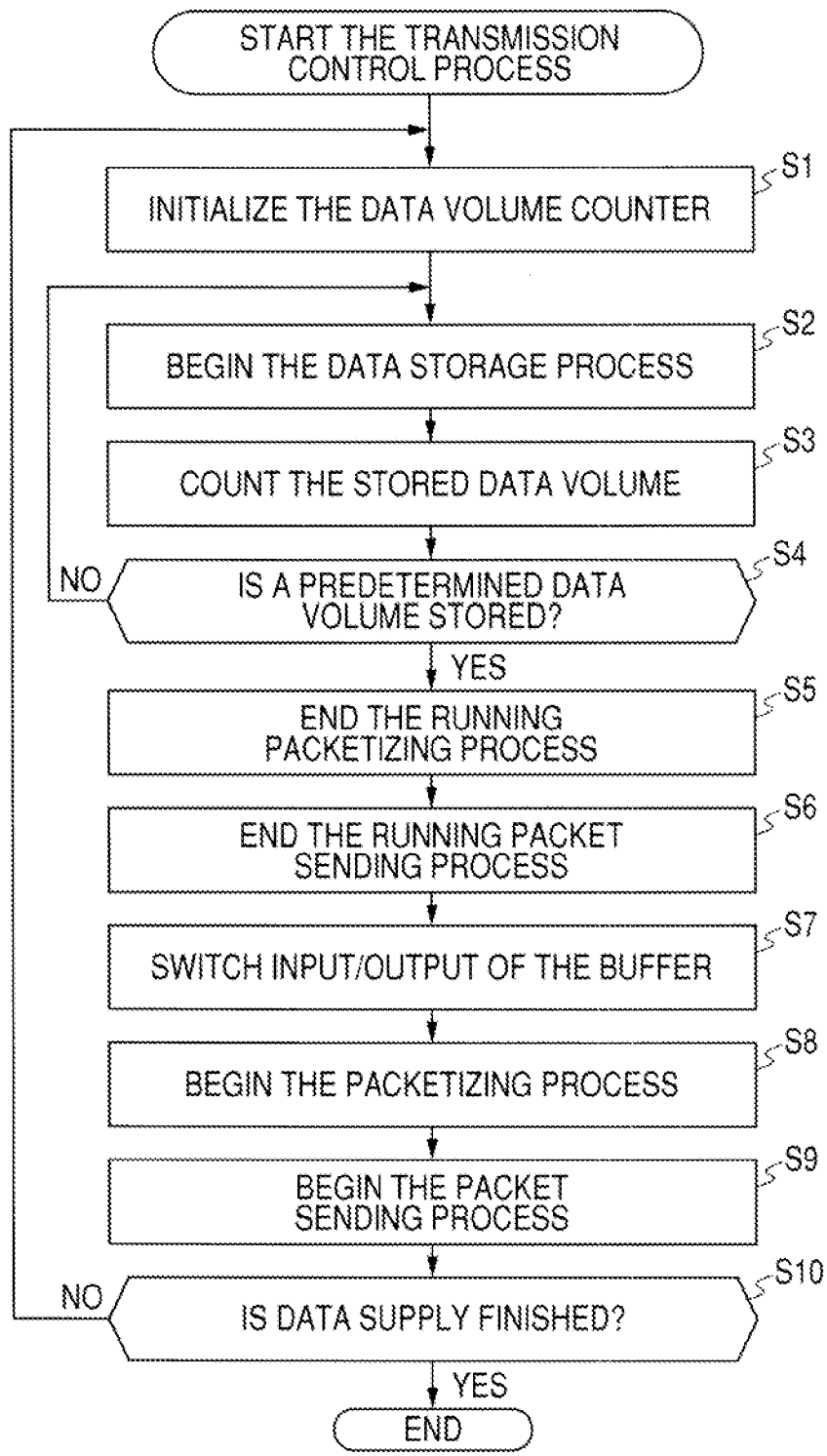
FIG. 5 shows a flow chart depicting an exemplary flow of a transmission control process.
Figure 6:
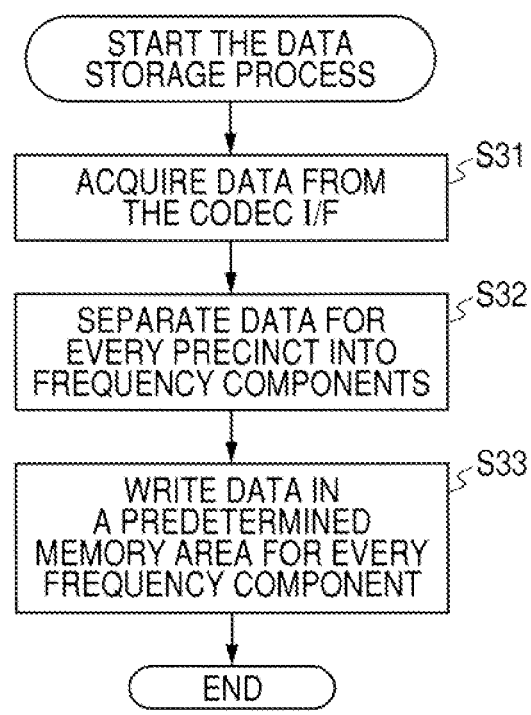
FIG. 6 shows a flow chart depicting an exemplary flow of a data storage process.

As similar to the case in which the packet transmission process is forcedly ended, when the network interface 36 is allowed to perform the packet transmission process for data in all the frequency bands, the control part 31 ends the packet transmission process shown in FIG. 16, and newly starts the packet transmission process for data in the subsequent precinct group stored in the other buffer at a predetermined timing (Step S9 in FIG. 5).

Figure 18:
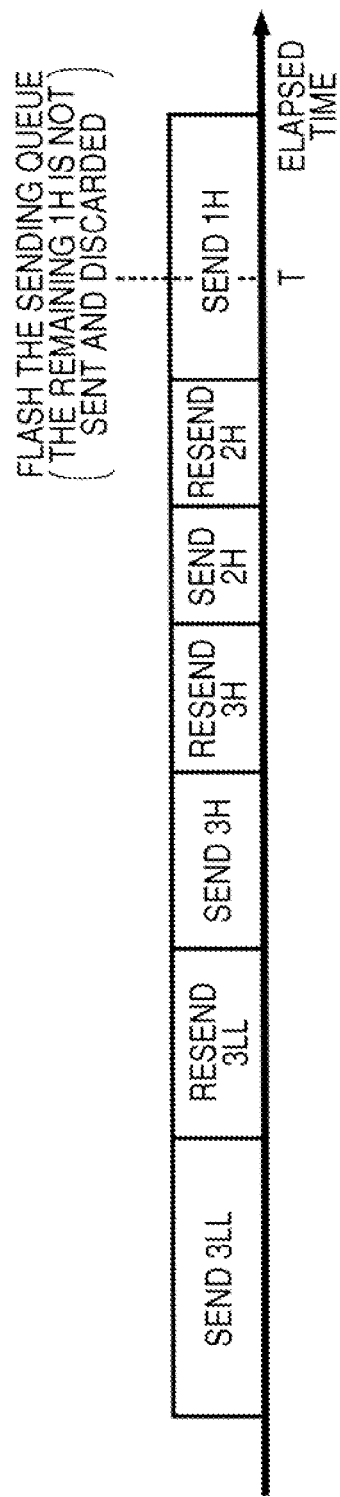
FIG. 18 shows a diagram illustrative of the manner of the occurrence of flashing the sending queue.

In other words, as shown in FIG. 18, the network interface 36 sends the packets of the individual frequency components in order of 3LL, 3H, 2H, and 1H. At this time, the network interface 36 also resends the individual packets as necessary.

In the example shown in FIG. 18, the network interface 36 sends the packet for 3LL, and then resends the packet for 3LL, it sends the packet for 3H, and then resends the packet for 3H, it sends the packet for 2H, and then resends the packet for 2H, and then it sends 1H. Then, at time T at which the packet for 1H is being sent, when data storage in the sorting buffer 34 is completed, the network interface 36 acquires the flash request for the sending queue from the control part 31, it does not send the remaining data of 1H, it discards the data, and it starts the process for data in the subsequent precinct group.

As described above, the queue is flashed at every predetermined timing, that is, the resending control is discontinues to ensure real time transmission processing for entire image data. In addition, data subjected to wavelet transformation more highly contributes to image quality as the frequency band is lower. Therefore, lower frequency components are in turn sent to the receiver, which is to send lower frequency components in higher priority than high frequency components, whereby image quality is improved in accordance with the amount of the packets received in the receiver.

In addition, in the description above, it is described that the codec 21 supplies data subjected to line based wavelet transformation in units of precincts to the sending unit 11. However, for example, in the case in which the codec 21 inputs data in units of frequency components for multiple times, the sorting processing part 33 may omit the process in Step S32 in FIG. 6.

In addition, in the description above, it is described that the sorting buffer 34 has two buffers, the first buffer 51 and the second buffer 52. However, the sorting buffer 34 may have three or more buffers, or it may be configured of a single buffer. However, it is necessary that the control part 31 controls the input and output of individual buffers matching with the number of the buffers. In addition, in the case in which image data subjected to line based wavelet transformation is sent in real time, a plurality of buffers is necessary. In addition, the storage capacity of a plurality of the buffers may be the same, or may be different from each other.

Moreover, in the description above, it is described that the sorting processing part 33 stores a predetermined volume of data in the first buffer 51 or the second buffer 52, and then the control part 31 makes the flash request for the sending queue, but it is not restricted thereto. For example, a timer may be used to control the timing for making a request.

Figure 19:
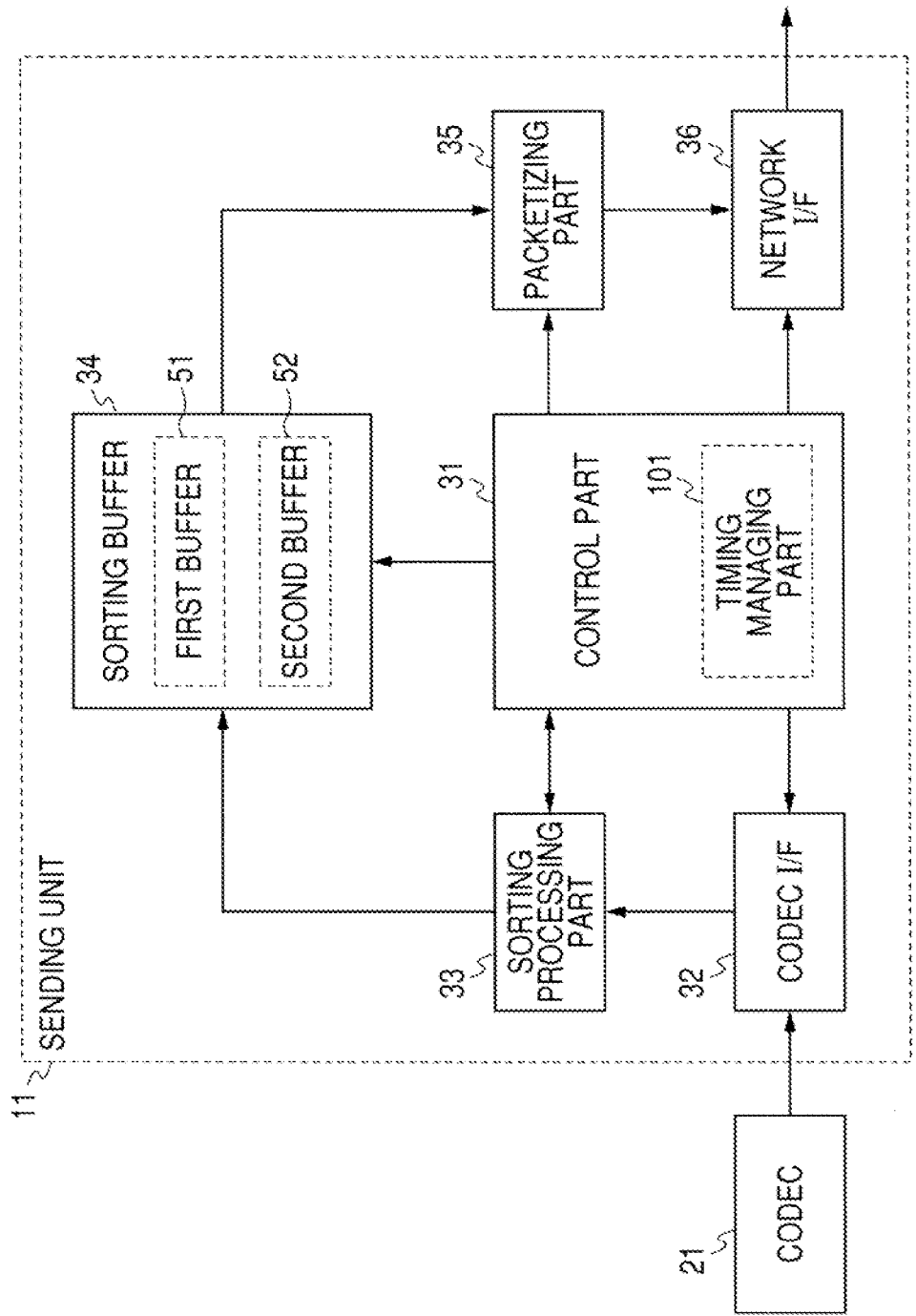
FIG. 19 shows a diagram depicting another exemplary configuration of a sending unit to which an embodiment of the invention is adapted.

FIG. 19 shows a diagram depicting another sending unit 11 to which an embodiment of the invention is adapted. In the example shown in FIG. 19, instead of the data volume counter 41, a control part 31 has a timing managing part 101 which has a function of clocking a time period. The timing managing part 101 clocks a predetermined time period defined in advance, and the control part 31 controls the individual parts in accordance with the clocked time period. In other words, in this case, the switching of the input and output of the sorting buffer 34 and the flashing of the sending queue are repeated at every fixed time period.

In addition, the timing managing part 101 may divide proportionally and compute the timing to flash the sending queue depending on data volume, or may divide proportionally and compute the timing to flash the sending queue depending on the significance of the position on the screen (it can be identified easily by the precinct number). For example, proportional division and computation depending on the significance on the screen is to set the sending time of the screen lower part longer in which it is highly likely to include captions in the case of contents such as movies.

However, even in the case in which the number of lines of the base band necessary to generate a single precinct is eight lines in the steady state (in the case of three wavelet decomposition levels), 37 lines may be necessary in the upper end of the screen for exceptional processing, or data may be generated with eight lines or below. The number of lines for the precinct is not always fixed. Therefore, in the case in which the timing to flash the sending queue is controlled by the timer, the time period for sending the packet might not be secured sufficiently. Thus, as shown in FIG. 4, such a method is most efficient that the timing to make the flash request for the sending queue is controlled with the use of the event as a trigger that data storage in the subsequent sorting buffer is completed.

As described above, the output from the codec using line based wavelet transformation is stored within the range allowed by the delay request (or the range allowed by the buffer capacity) and sorted, and a plurality of the precincts of data is collectively sent, whereby the transmission efficiency can be maintained. Moreover, data is sent from lower frequency components, whereby degraded image quality can be suppressed as small as possible against losses.

In addition, the sending unit 11 described above is used to send data with degraded image quality as small as possible with a small delay while the throughput is being maintained in the radio communication paths, for example. Thus, such products can be implemented that compresses TV video in real time to be viewed wirelessly on another terminal and a picturephone of high quality with an ultra small delay. Moreover, in the case in which the sending unit 11 described above is applied to a camera product, a wireless camera system with a small delay can be implemented (a system in which the taken video is sent through radio communication paths and viewed on a monitor at a remote place). Particularly, a great advantage is expected in the field of security cameras having a key factor of immediacy.

In addition, in the description above, the case is described that an embodiment of the invention is adapted to the sending unit which sends image data as packets. However, an embodiment of the invention is not restricted thereto. For example, an embodiment of the invention can be adapted to a simple reproducing unit like the display on a preview screen in a digital still camera or a digital video camera images compressed in real time are reproduced.

FIG. 20 shows a diagram depicting a reproducing unit to which an embodiment of the invention is adapted. Although a reproducing unit 111 shown in FIG. 20 basically has the configuration similar to that of the sending unit 11 shown in FIG. 4, different from the sending unit 11, it has a decoder 135 instead of the packetizing part 35 and has an output interface (I/F) 136 instead of the network interface 36.

The decoder 135 reads data out of a sorting buffer 34 as similar to the packetizing part 35, but instead of packetizing data, it decodes the read data. In other words, the decoder 135 collectively in turn decodes a plurality of precincts of data from lower frequency components. The output interface 136 allows a display part 141 to display image data thus decoded.

For example, it is very important for a user to confirm that the composition of a taken image is satisfied, and that a moving subject (such as a car and an animal moving at high speed) can be followed well. In such a simple reproducing unit, the image quality of the image displayed is not important for the user so much, and it is enough for the user to know a rough outline. Therefore, high frequency components (1H) might be unnecessary, and in the case of performing the decoding process by software, decoding might not be finished within the actual time depending on the processing speed of a CPU (Central Processing Unit).

Then, as described above, the reproducing unit 111 collectively in turn decodes a plurality of the precincts of data from lower frequency components the decoder, and when CPU processing is not finished within the actual time, it does not decode high frequency components, and starts decoding a plurality of the precincts of subsequent data. With this configuration, in the case in which the decoding of high frequency components is omitted for the image to be displayed on the display part 141, although image quality is degraded, real time image display can be secured to display the image at earlier timing or to suppress frame skipping in moving images.

In addition, since the time particle size becomes finer (for example, in the case of an image of 1080/601, 474 us per precinct) when time constraints (the flash request timing) in the decoding process are performed in units of precincts, the time accuracy in the CPU might not follow. Then, time constraints are made in units of a plurality of precincts, whereby the control part 31 can easily conduct time control. In contrast to this, since the precincts of the overall image are collected to prolong a delay to start display, the advantages of simple reproduction are impaired more or less. Therefore, it is desirable to collect precincts in units of about five to eight precincts.

As described above, the precincts are collected by five to eight precincts, whereby only decoding and display are performed from the upper part of the screen, and a user can determine whether a good image is taken only by viewing the image from the upper part of the screen. Therefore, since it is intended to shorten the time period to reference to a preview image by a user, the time period to display the preview image can be reduced, leading to decreasing power consumption.

In addition, in FIG. 20, it is described that the reproducing unit 111 acquires and reproduces data outputted from the codec 21. However, for example, a network interface may be used instead of the codec interface 32 to acquire and reproduce data supplied from a sending unit. In this case, the reproducing unit 111 also functions as a receiving unit corresponding to the sending unit. In other words, an embodiment of the invention can be adapted to the receiving unit as well. Of course, other than the units described above, an embodiment of the invention may be adapted to any information processing apparatus as long as the apparatus is such units that process image data subjected to line based wavelet transformation including a communication unit, an imaging device, a recording device, and an image processing apparatus.

A series of the process steps described above may be processed by hardware, or by software. In this case, for example, it may be configured as a personal computer shown in FIG. 21.

In FIG. 21, a CPU 201 of a personal computer 200 runs various process steps in accordance with a program stored in a ROM (Read Only Memory) 202, or a program loaded from a storage part 213 to a RAM (Random Access Memory) 203. The RAM 203 also stores data therein necessary to run various process steps by the CPU 201.

The CPU 201, the ROM 202, and the RAM 203 are connected to each other through a bus 204. To the bus 204, an input/output interface 210 is connected as well.

To the input/output interface 210, an input part 211 formed of a keyboard and a mouse, a display formed of CRT (Cathode Ray Tube) or LCD (Liquid Crystal Display), an output part 212 formed of a speaker, the storage part 213 formed of a hard disk, and a communication part 214 formed of a modem are connected. The communication part 214 processes communications via a network including the Internet.

To the input/output interface 210, a drive 215 is connected as necessary, a removable medium 221 is properly mounted such as a magnetic disk, an optical disk, a magneto-optical disk, or a semiconductor memory, and a computer program read out of them is installed in the storage part 213 as necessary.

In the case in which a series of the process steps described above is run by software, a program configuring the software is installed via the network or from the recording medium.

For example, as shown in FIG. 21, as separated from the unit main body, the recording medium is configured of the removable medium 221 on which a program is recorded for distributing the program to a user, formed of a magnetic disk (including a flexible disk), an optical disk (including CD-ROM (Compact Disk-Read Only Memory), and DVD (Digital Versatile Disk)), a magneto-optical disk (MD (Mini-Disk) (trademark)), or configured of a semiconductor memory, or may be configured of the ROM 202 on which the program is recorded or a hard disk included in the storage part 213, the device is incorporated in the unit main body in advance for distributing a user.

In addition, in the specification, the steps describing the program recorded on the recording medium of course include the process steps performed in time series in the described order, or may not be necessarily processed in time series, or may be processed in parallel, or discretely.

In addition, in the specification, the system represents the overall apparatus configuring a plurality of devices (units).

In addition, as described above, the configuration described as a single unit may be divided to configure a plurality of devices. In contrast to this, as described above, the configuration described as a plurality of devices may be configured as a singe unit. In addition, the configuration of the individual devices may be added with the configuration other than the described ones. Moreover, as long as the configurations or the operations are substantially equal as the overall system, a part of the configuration of a certain device may be included in the configuration of the other devices. In other words, an embodiment of the invention is not restricted to the embodiment described above, which can be modified within the scope nit deviating from the teachings of an embodiment of the invention.

The invention can be adapted to a video camera, for example.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus which sends image data subjected to line based wavelet transformation to another device, the apparatus comprising:
    a hardware processor; and
    a memory coupled to the processor and storing a program that, when executed by the processor, causes the apparatus to perform a method, the method comprising:
        splitting the image data supplied into units of precincts that are the set of lines to be a unit of processing for the line based wavelet transformation for every frequency component;
        storing a plurality of precincts of the image data;
        packetizing multiple 3LL frequency components of the plurality of the precincts of the image data before packetizing any other frequency components of the plurality of the precincts of the image data;
            wherein 3LL frequency components comprise low frequency image information from horizontal wavelet convolution and low frequency image information from vertical wavelet convolution, at a third decomposition level;
        sending the packetized frequency components of the plurality of the precincts of the image data to the another device over a communication path;
        resending the packetized frequency components for packet losses in the communication path until a confirmation is received from the another device; and
            after the confirmation is received, packetizing frequency components other than 3LL frequency components.

2. The information processing apparatus according to claim 1, wherein the method comprises splitting each of the plurality of the precincts of the image data into frequency components.

3. The information processing apparatus according to claim 1, comprising:
    a plurality of storage parts, each of which stores frequency components of a plurality of precincts of image data,
    wherein the method comprises switching input and output of each of the plurality of the storage parts.

4. The information processing apparatus according to claim 3, wherein:
    the method comprises counting a data volume of the image data stored in one of the storage parts; and
    the switching switches input and output of each of the storage parts based on a count value of the data volume, and allows discarding a packet that has not been sent yet.

5. The information processing apparatus according to claim 3, wherein:
    the method comprises clocking a time period; and
    the switching switches input and output of each of the storage parts at a timing based on the time period, and allows discarding a packet that has not been sent.

6. An information processing method of an information processing apparatus which sends image data subjected to line based wavelet transformation to another device, the method comprising the steps of:
    splitting the image data supplied into units of precincts that are the set of lines to be a unit of processing for the line based wavelet transformation for every frequency component, and storing a plurality of precincts of the image data;
    packetizing multiple 3LL frequency components of the stored plurality of the precincts of the image data before packetizing any other frequency components of the stored plurality of the precincts of the image data;
        wherein 3LL frequency components comprise low frequency image information from horizontal wavelet convolution and low frequency image information from vertical wavelet convolution, at a third decomposition level;
    sending the packetized frequency components of the stored plurality of the precincts of the image data to the another device over a communication path;
    resending the packetized frequency components for packet losses in the communication path until a confirmation is received from the another device; and
    after the confirmation is received, packetizing frequency components other than 3LL frequency components.

7. A non-transitory, computer-readable storage medium storing a program that, when executed by a computer, causes the computer to perform a process of an information processing apparatus which sends image data subjected to line based wavelet transformation to another device, the process comprising the steps of:
    splitting the image data supplied into units of precincts that are the set of lines to be a unit of processing for the line based wavelet transformation for every frequency component, and storing a plurality of precincts of the image data;
    packetizing multiple 3LL frequency components of the stored plurality of the precincts of the image data before packetizing any other frequency components of the stored plurality of the precincts of the image data;
        wherein 3LL frequency components comprise low frequency image information from horizontal wavelet convolution and low frequency image information from vertical wavelet convolution, at a third decomposition level;
    sending the packetized frequency components of the stored plurality of the precincts of the image data to the another device over a communication path;
    resending the packetized frequency components for packet losses in the communication path until a confirmation is received from the another device; and after the confirmation is received, packetizing frequency components other than 3LL frequency components.

* * * * *